United States Patent
Yang et al.

(10) Patent No.: US 9,729,046 B1
(45) Date of Patent: Aug. 8, 2017

(54) POWER SUPPLY APPARATUS (71) Applicant: LITE-ON TECHNOLOGY CORP., Taipei (TW)

(72) Inventors: Te-Hong Yang, Taipei (TW); Ming-Tsung Hsieh, Taipei (TW); Yu-Kang Lo, Taipei (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 15/186,833

(22) Filed: Jun. 20, 2016

(30) Foreign Application Priority Data

Feb. 5, 2016 (CN) .......................... 2016 1 0081811

(51) Int. Cl.
*G05F 1/62* (2006.01)
*H02M 3/04* (2006.01)
*H02M 1/08* (2006.01)

(52) U.S. Cl.
CPC ............... *H02M 3/04* (2013.01); *H02M 1/08* (2013.01)

(58) Field of Classification Search
CPC ..... G05F 1/14; G05F 1/45; G05F 1/62; G05F 1/455; H02M 3/04; H02M 3/156–3/158; H02M 1/083; H01F 27/2847

USPC ....... 323/234, 247, 254, 255, 265, 271, 275, 323/282, 285

See application file for complete search history.

(56) References Cited

U.S. PATENT DOCUMENTS

| 9,318,955 | B2 * | 4/2016 | Shimizu | ................ H02M 3/157 |
| 2010/0109625 | A1 * | 5/2010 | Ohtake | ............... H02M 3/1584 323/282 |
| 2015/0303806 | A1 * | 10/2015 | Madsen | ................ H02M 3/158 323/271 |
| 2016/0241145 | A1 * | 8/2016 | Matsuura | .............. H02M 3/156 |

* cited by examiner

*Primary Examiner* — Yemane Mehari
(74) *Attorney, Agent, or Firm* — Rosenberg, Klein & Lee (57) ABSTRACT

A power supply apparatus includes a switch, a converting module and a control module. When the switch operates in an ON state, an input voltage is outputted through the switch to serve as an output voltage. The converting module selectively converts the input voltage into the output voltage. When the power supply apparatus operates in a mode where the switch operates in an OFF state, where the converting module performs the conversion, and where the output voltage is stabilized at a target voltage value, and when a condition associated with the input voltage is met, the control module causes the output voltage to gradually change toward the input voltage.

20 Claims, 6 Drawing Sheets

POWER SUPPLY APPARATUS

CROSS-REFERENCE TO RELATED APPLICATION

This application claims priority of Chinese Patent Application No. 201610081811.8, filed on Feb. 5, 2016.

FIELD

The disclosure relates to power supply, and more particularly to a power supply apparatus operable in multiple modes.

BACKGROUND

A conventional power supply apparatus receives a DC (direct current) input voltage, and outputs a DC output voltage associated with the input voltage. When the input voltage is greater than a predetermined reference voltage value, the conventional power supply apparatus operates in a first mode to output the input voltage as the output voltage. When the input voltage is less than the reference voltage value, the conventional power supply apparatus operates in a second mode to boost-convert the input voltage into the output voltage and stabilize the output voltage at a predetermined target voltage value. The conventional power supply apparatus directly switches from one of the first and second modes to the other of the first and second modes, and thus endures relatively high current stress. In addition, the conventional power supply apparatus causes each of the input and output voltages to have a relatively large ripple component, and as a result, a system using the conventional power supply apparatus has a relatively short lifetime and relatively poor stability.

SUMMARY

Therefore, an object of the disclosure is to provide a power supply apparatus that can alleviate at least one of the drawbacks of the prior art.

According to the disclosure, the power supply apparatus includes an input terminal, an output terminal, a switch, a converting module and a control module. An input voltage is received at the input terminal. An output voltage is outputted at the output terminal. The switch is coupled between the input and output terminals, and is operable between an ON state and an OFF state based on a first control signal. When the switch operates in the ON state, the input voltage is outputted through the switch to serve as the output voltage. The converting module is coupled between the input and output terminals, and selectively converts the input voltage into the output voltage based on a second control signal. The control module is coupled to the input and output terminals, the switch and the converting module, and generates the first and second control signals based at least on the input and output voltages. The power supply apparatus is operable in at least a first mode, where the first control signal is such that the switch operates in the ON state, and where the second control signal is such that the converting module does not perform the conversion, and a second mode, where the first control signal is such that the switch operates in the OFF state, and where the second control signal is generated based on the output voltage in such a way that the converting module performs the conversion and that the output voltage is stabilized at a predetermined target voltage value. When the power supply apparatus operates in the second mode and a condition associated with the input voltage is met, the control module generates the first control signal in such a way that the switch operates in the OFF state, and generates the second control signal in such a way that the converting module performs the conversion and that the output voltage gradually changes toward the input voltage.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
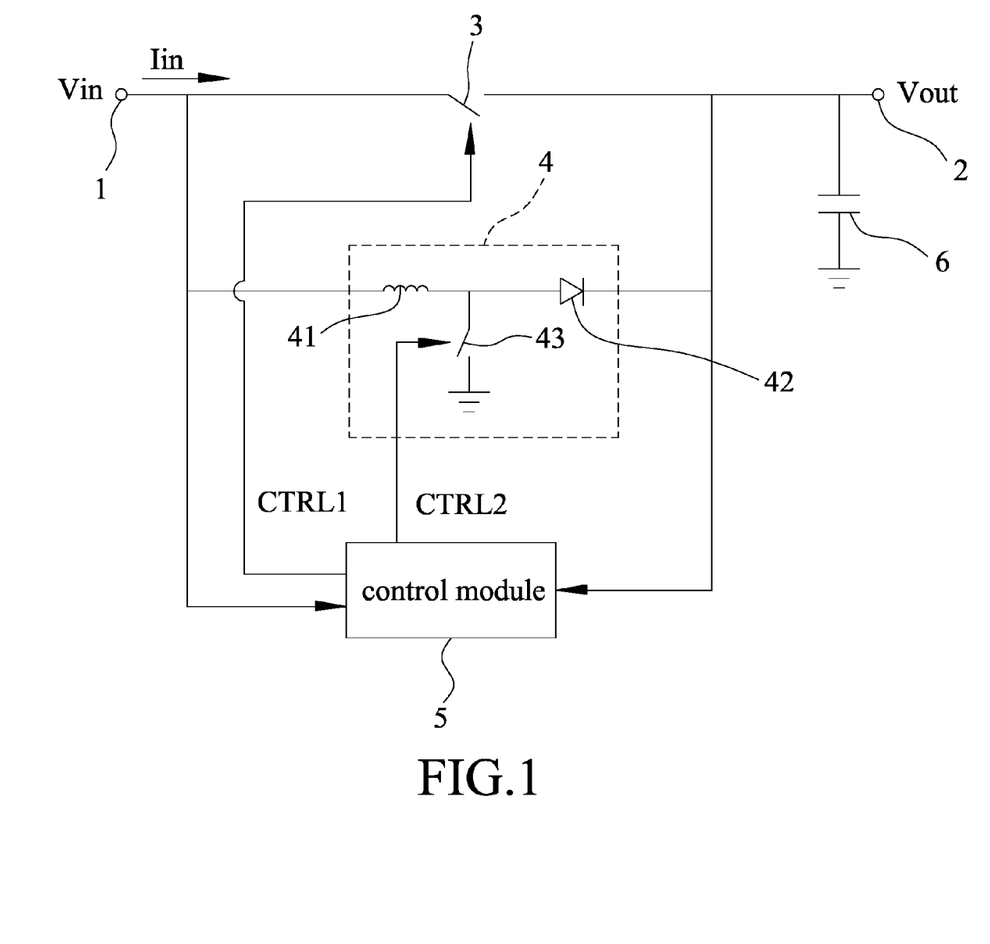
FIG. 1 is a circuit block diagram illustrating a first embodiment of a power supply apparatus according to the disclosure.
Figure 2:
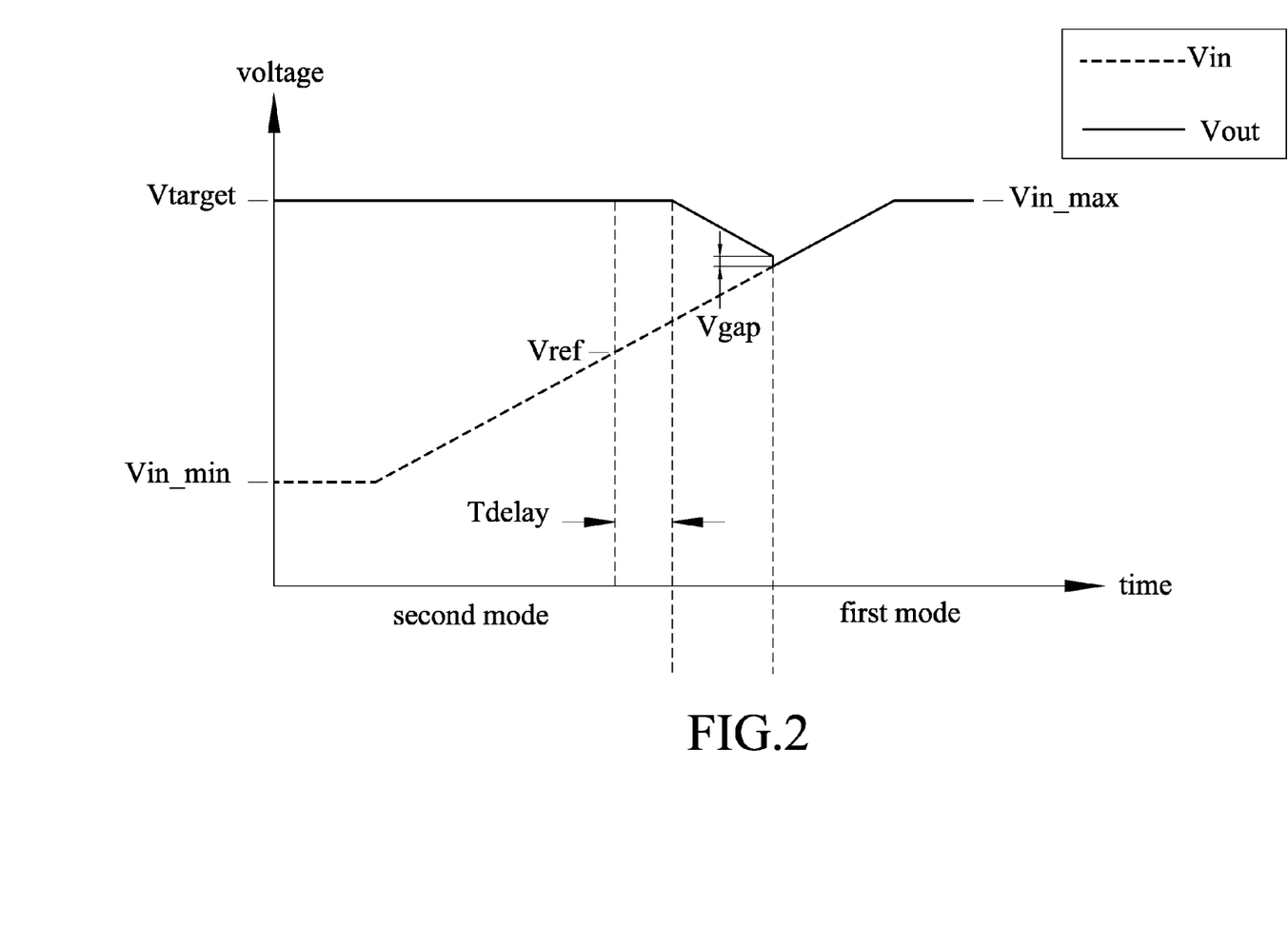
FIG. 2 is a timing diagram illustrating operation of the first embodiment when switching from a second mode to a first mode.
Figure 3:
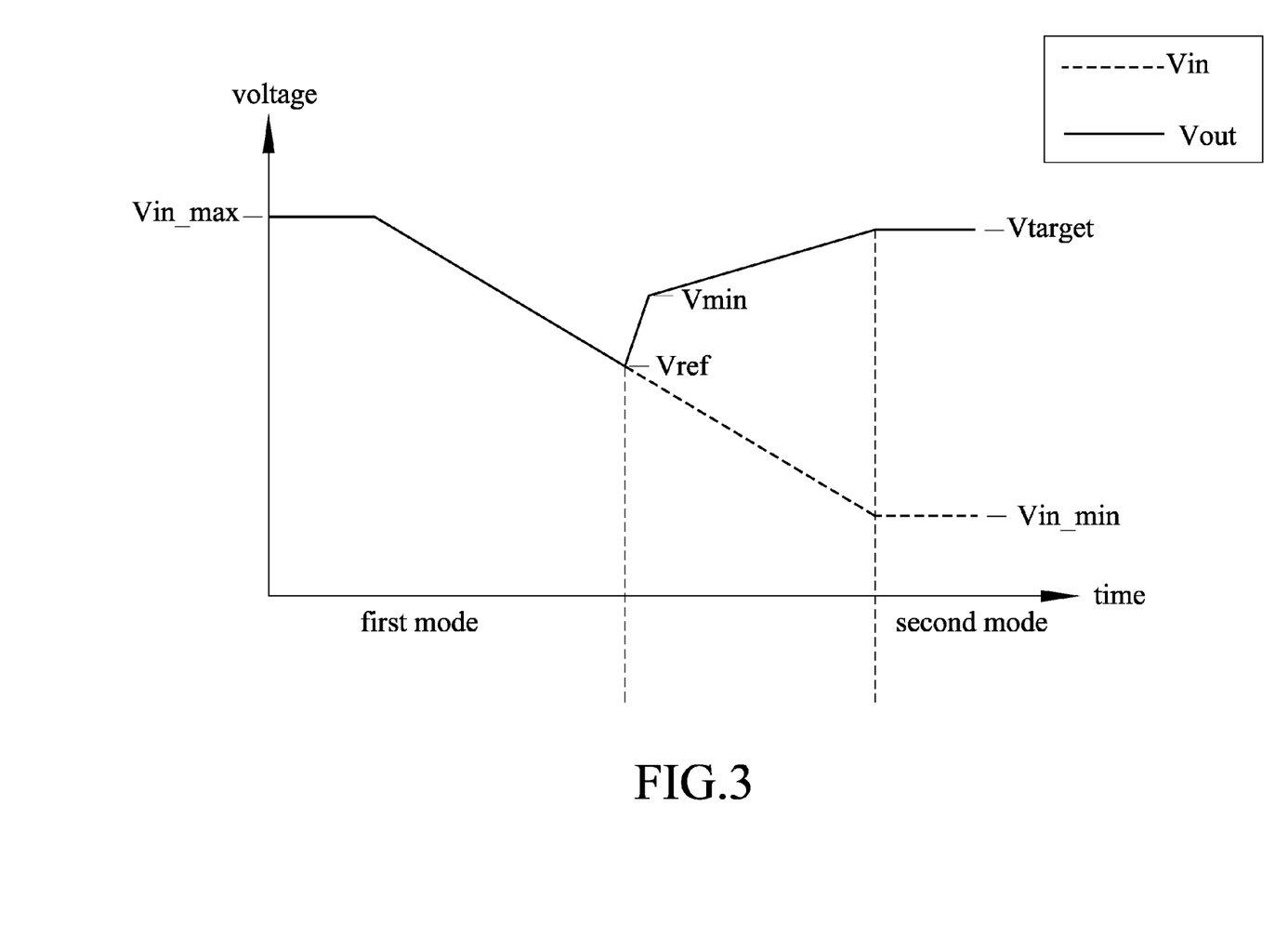
FIG. 3 is a timing diagram illustrating operation of the first embodiment when switching from the first mode to the second mode.

Referring to FIGS. 1, 2 and 3, a first embodiment of a power supply apparatus according to the disclosure includes an input terminal 1, an output terminal 2, a first switch 3, a converting module 4, a control module 5 and a capacitor 6, is used to receive a DC (direct current) input voltage (Vin) and an input current (Iin) at the input terminal 1, and outputs a DC output voltage (Vout) at the output terminal 2. The input voltage (Vin) is within a range of between a minimum input voltage value (Vin_min) and a maximum input voltage value (Vin_max), i.e., Vin_min≤Vin≤Vin_max. The capacitor 6 is coupled between the output terminal 2 and a reference node (e.g., ground), and filters the output voltage (Vout).

The first switch 3 is coupled between the input and output terminals 1, 2, and is operable between an ON state and an OFF state based on a first control signal (CTRL1). When the first switch 3 operates in the ON state, the input voltage (Vin) is outputted through the first switch 3 to serve as the output voltage (Vout).

The converting module 4 is coupled between the input and output terminals 1, 2, and selectively converts the input voltage (Vin) into the output voltage (Vout) based on a second control signal (CTRL2). In this embodiment, the conversion performed by the converting module 4 is boost conversion, and the converting module 4 includes an inductor 41, a diode 42 and a second switch 43 that are coupled to each other in a Y shape among the input and output terminals 1, 2 and the reference node. The inductor 41 is coupled to the input terminal 1. The diode 42 has a cathode coupled to the output terminal 2. The second switch 43 is coupled to the reference node, and is operable between an ON state and an OFF state based on the second control signal (CTRL2). As a result, a magnitude of the output voltage (Vout) may be adjusted as desired by control of a duty ratio of the second control signal (CTRL2).

The control module 5 is coupled to the input and output terminals 1, 2 and the first and second switches 3, 43, and generates the first and second control signals (CTRL1, CTRL2) based on the input and output voltages (Vin, Vout) and/or on the input current (Iin). In this embodiment, the control module 5 may be an MCU (micro control unit) programmed to perform operations as described hereinafter.

Under the control of the control module 5, the power supply apparatus is operable in at least one of a first mode, where the first control signal (CTRL1) is such that the first switch 3 operates in the ON state, and where the second control signal (CTRL2) is such that the second switch 43 operates in the OFF state (i.e., the converting module 4 does not perform the conversion), and a second mode, where the first control signal (CTRL1) is such that the first switch 3 operates in the OFF state, and where the second control signal (CTRL2) is generated based on the output voltage (Vout) in such a way that the second switch 43 alternates between the ON and OFF states (i.e., the converting module 4 performs the conversion) and that the output voltage (Vout) is stabilized at a predetermined target voltage value (Vtarget). In this embodiment, the target voltage value (Vtarget) is greater than the minimum input voltage value (Vin_min).

As shown in FIG. 2, when the power supply apparatus operates in the second mode and a first condition associated with the input voltage (Vin) is met, the control module 5 generates the first control signal (CTRL1) in such a way that the first switch 3 operates in the OFF state, and generates the second control signal (CTRL2) in such a way that the second switch 43 alternates between the ON and OFF states (i.e., the converting module 4 performs the conversion) and that the output voltage (Vout) gradually changes (e.g., changes at a predetermined slope) toward the input voltage (Vin). In practice, the control module 5 may compare the output voltage (Vout) and the input voltage (Vin) so as to adjust the duty ratio of the second control signal (CTRL2), causing the output voltage (Vout) to gradually change toward the input voltage (Vin). As a result, the power supply apparatus operates neither in the first mode nor in the second mode. In this embodiment, the first condition is met when the input voltage (Vin) has been greater than a predetermined reference voltage value (Vref), which is greater than the minimum input voltage value (Vin_min) and less than the maximum input voltage value (Vin_max) and the target voltage value (Vtarget), for a predetermined delay time (Tdelay). Moreover, in this embodiment, when the power supply apparatus operates in the second mode and the first condition is met, the second control signal (CTRL2) is generated based on one of the output voltage (Vout) and the input current (Iin) in such a way that the output voltage (Vout) gradually decreases (e.g., decreases at the predetermined slope) so as to approach the input voltage (Vin). It should be noted that, in other embodiments, the first condition may be irrelevant to the delay time (Tdelay).

As shown in FIG. 2, when a difference between the input and output voltages (Vin, Vout) decreases to a predetermined gap voltage value (Vgap), the control module 5 generates the first and second control signals (CTRL1, CTRL2) in such a way that the power supply apparatus enters the first mode. It should be noted that FIG. 2 depicts a circumstance where the power supply apparatus has a zero processing time. In reality, the processing time of the power supply apparatus would not be zero. Therefore, when the difference between the input and output voltages (Vin, Vout) decreases to the gap voltage value (Vgap), the power supply apparatus does not enter the first mode right away; and when the power supply apparatus enters the first mode, the difference between the input and output voltages (Vin, Vout) would have decreased to be less than the gap voltage value (Vgap). In this embodiment, the gap voltage value (Vgap) is predetermined to be sufficient that the difference between the input and output voltages (Vin, Vout) is zero upon the entrance of the power supply apparatus into the first mode.

As shown in FIG. 3, when the power supply apparatus operates in the first mode and a second condition associated with the input voltage (Vin) is met, the control module 5 generates the first control signal (CTRL1) in such a way that the first switch 3 operates in the OFF state, and generates the second control signal (CTRL2) in such a way that the second switch 43 alternates between the ON and OFF states (i.e., the converting module 4 performs the conversion) and that the output voltage (Vout) gradually changes (e.g., changes at a predetermined slope) toward the target voltage value (Vtarget). In practice, the control module 5 may compare the output voltage (Vout) and the target voltage value (Vtarget) so as to adjust the duty ratio of the second control signal (CTRL2), causing the output voltage (Vout) to gradually change toward the target voltage value (Vtarget). In this embodiment, the second condition is met when the input voltage (Vin) is less than the reference voltage value (Vref); and when the power supply apparatus operates in the first mode and the second condition is met, the second control signal (CTRL2) is generated based on one of the output voltage (Vout) and the input current (Iin) in such a way that the output voltage (Vout) gradually increases (e.g., increases at the predetermined slope) from a predetermined minimum voltage value (Vmin), which is greater than or equal to the reference voltage value (Vref) and less than the target voltage value (Vtarget), so as to approach the target voltage value (Vtarget). It is noted that, when the minimum voltage value (Vmin) is greater than the reference voltage value (Vref), the output voltage (Vout) may directly jump from the reference voltage value (Vref) to the minimum voltage value (Vmin) within a very short time as shown in FIG. 3 since the capacitor 6 causes the output voltage (Vout) to change continuously.

As shown in FIG. 3, when the output voltage (Vout) reaches the target voltage value (Vtarget), the control module 5 generates the first and second control signals (CTRL1, CTRL2) in such a way that the power supply apparatus enters the second mode.

In view of the above, the power supply apparatus of this embodiment has the following advantages:

1. With the control module 5 operating in the corresponding specific manner as described above when the power supply apparatus operates in the second mode and the first condition is met, the power supply apparatus draws a relatively small inrush current and thus endures relatively low current stress when switching from the second mode to the first mode.

2. With the control module 5 operating in the specific manner as described above when the power supply apparatus operates in the first mode and the second condition is met, the output voltage (Vout) increases relatively slowly to the target voltage value (Vtarget) and thus the power supply apparatus endures relatively low current stress when the power supply apparatus switches from the first mode to the second mode.

3. Operation of the control module 5 when the power supply apparatus operates in the second mode and the first condition is met, and operation of the control module 5 when the power supply apparatus operates in the first mode and the second condition is met causes the power supply apparatus to continuously draw energy at the input terminal 1, so each of the input and output voltages (Vin, Vout) has a relatively small ripple component, and thus a system using the power supply apparatus has a relatively long lifetime and relatively good stability.

4. With the delay time (Tdelay), undesired switching of the power supply apparatus from the second mode to the first mode when the input voltage (Vin) is not stable or contains noise can be prevented.

Figure 4:
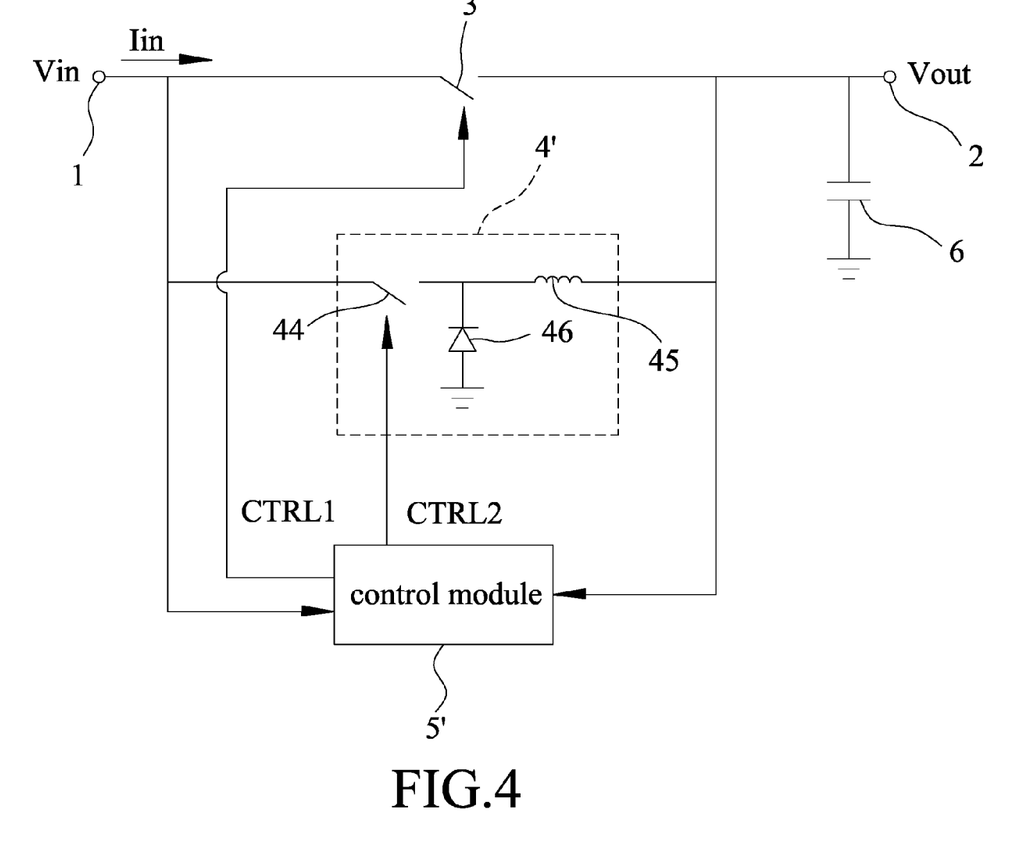
FIG. 4 is a circuit block diagram illustrating a second embodiment of a power supply apparatus according to the disclosure.
Figure 5:
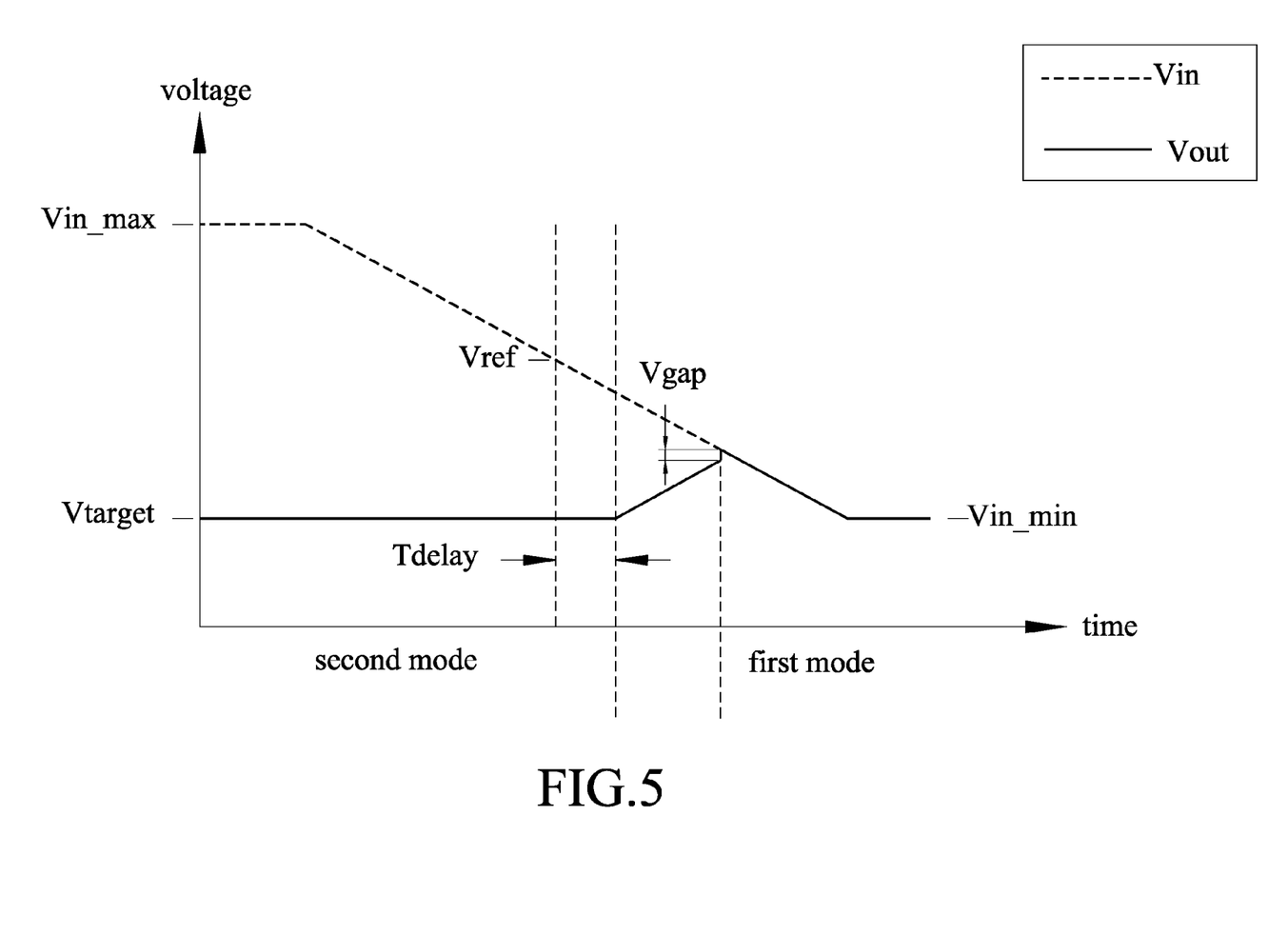
FIG. 5 is a timing diagram illustrating operation of the second embodiment when switching from the second mode to the first mode.
Figure 6:
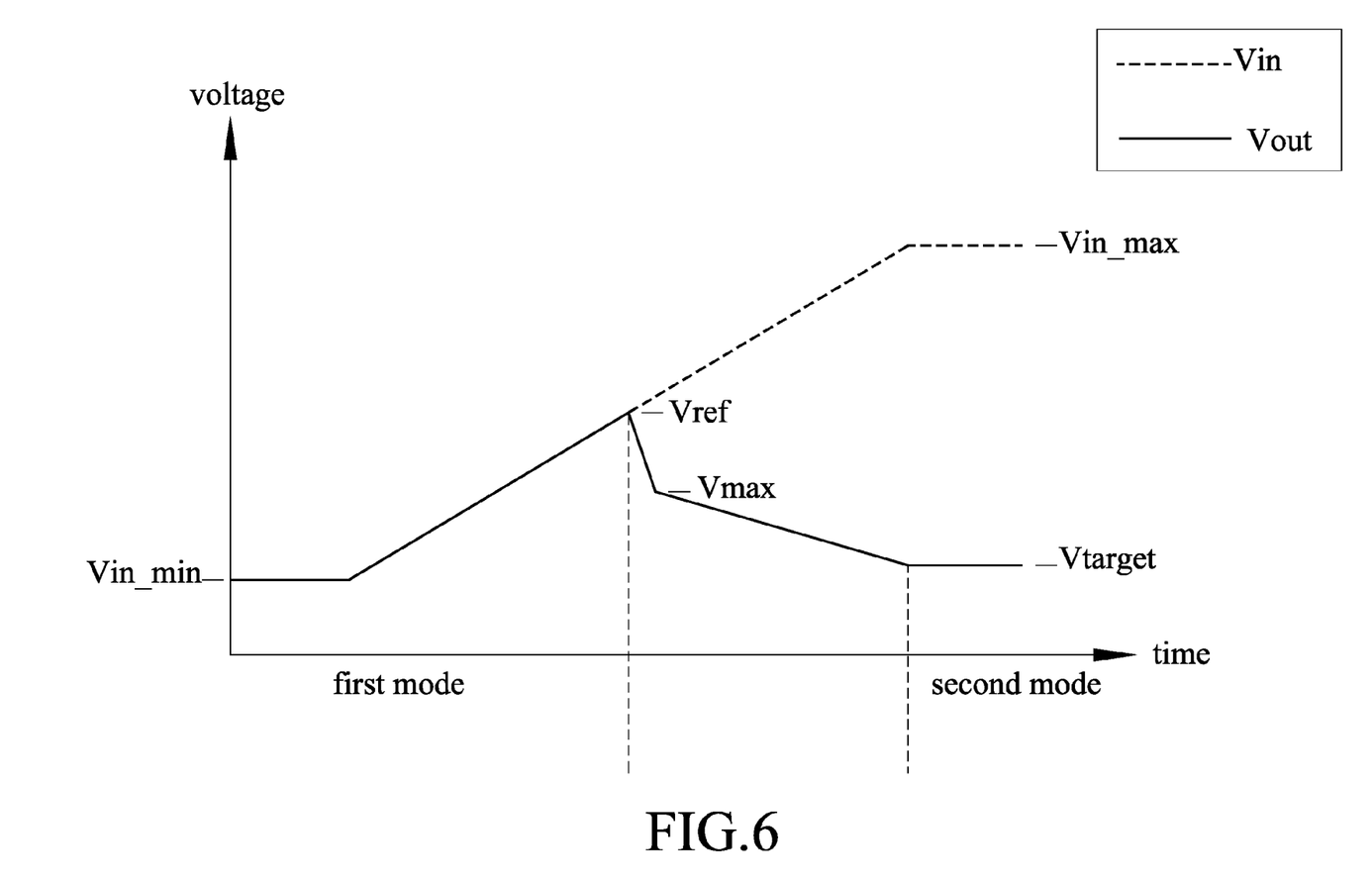
FIG. 6 is a timing diagram illustrating operation of the second embodiment when switching from the first mode to the second mode.

Referring to FIGS. 4, 5 and 6, a second embodiment of a power supply apparatus according to the disclosure is a modification of the first embodiment, and differs from the first embodiment in that:

1. The conversion performed by the converting module 4' is buck conversion, and the converting module 4' includes a second switch 44, an inductor 45 and a diode 46 that are coupled to each other in a Y shape among the input and output terminals 1, 2 and the reference node. The second switch 44 is coupled to the input terminal 1 and further to the control module 5', and is operable between an ON state and an OFF state based on the second control signal (CTRL2). The inductor 45 is coupled to the output terminal 2. The diode 46 has an anode coupled to the reference node.

2. The target voltage value (Vtarget) is less than the maximum input voltage value (Vin_max).

3. The first condition is met when the input voltage (Vin) has been less than the reference voltage value (Vref), which is greater than the minimum input voltage value (Vin_min) and the target voltage value (Vtarget) and less than the maximum input voltage value (Vin_max), for the predetermined delay time (Tdelay). It should be noted that, in other embodiments, the first condition may be irrelevant to the delay time (Tdelay).

4. When the power supply apparatus operates in the second mode and the first condition is met, the second control signal (CTRL2) is generated based on one of the output voltage (Vout) and the input current (Iin) in such a way that the output voltage (Vout) gradually increases (e.g., increases at a predetermined slope) so as to approach the input voltage (Vin).

5. The second condition is met when the input voltage (Vin) is greater than the reference voltage value (Vref).

6. When the power supply apparatus operates in the first mode and the second condition is met, the second control signal (CTRL2) is generated based on one of the output voltage (Vout) and the input current (Iin) in such a way that the output voltage (Vout) gradually decreases (e.g., decreases at a predetermined slope) from a predetermined maximum voltage value (Vmax), which is less than or equal to the reference voltage value (Vref) and greater than the target voltage value (Vtarget), so as to approach the target voltage value (Vtarget). It is noted that, when the maximum voltage value (Vmax) is smaller than the reference voltage value (Vref), the output voltage (Vout) may directly jump from the reference voltage value (Vref) to the maximum voltage value (Vmax) within a very short time as shown in FIG. 6 since the capacitor 6 causes the output voltage (Vout) to change continuously.

In view of the above, the power supply apparatus of this embodiment has the following advantages:

1. With the control module 5' operating in the prescribed manner when the power supply apparatus operates in the second mode and the first condition is met, the power supply apparatus draws a relatively small inrush current and thus endures relatively low current stress when switching from the second mode to the first mode.

2. With the control module 5' operating in the manner described above when the power supply apparatus operates in the first mode and the second condition is met, the output voltage (Vout) decreases relatively slowly to the target voltage value (Vtarget) and thus the power supply apparatus endures relatively low current stress when the power supply apparatus switches from the first mode to the second mode.

3. Operation of the control module 5' when the power supply apparatus operates in the second mode and the first condition is met, and operation of the control module 5' when the power supply apparatus operates in the first mode and the second condition is met causes the power supply apparatus to continuously draw energy at the input terminal 1, so each of the input and output voltages (Vin, Vout) has a relatively small ripple component, and thus a system using the power supply apparatus has a relatively long lifetime and relatively good stability.

4. With the delay time (Tdelay), undesired switching of the power supply apparatus from the second mode to the first mode when the input voltage (Vin) is not stable or contains noise can be prevented.

In the description above, for the purposes of explanation, numerous specific details have been set forth in order to provide a thorough understanding of the embodiment (s). It will be apparent, however, to one skilled in the art, that one or more other embodiments may practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connect ion with what is (are) considered the exemplary embodiment(s), it is understood that the disclosure is not limited to the disclosed embodiment(s) but is intended to cover various arrangements included within the spirit and scope of the broadest interpretation so as to encompass all such modifications and equivalent arrangements.

What is claimed is:

1. A power supply apparatus comprising:
an input terminal at which an input voltage is received;
an output terminal at which an output voltage is outputted;
a first switch coupled between said input and output terminals, and operable between an ON state and an OFF state based on a first control signal, wherein when said first switch operates in the ON state, the input voltage is outputted through said first switch to serve as the output voltage;
a converting module coupled between said input and output terminals, and selectively converting the input voltage into the output voltage based on a second control signal; and
a control module coupled to said input and output terminals, said first switch and said converting module, and generating the first and second control signals based at least on the input and output voltages;

said power supply apparatus being operable in at least a first mode, where the first control signal is such that said first switch operates in the ON state, and where the second control signal is such that said converting module does not perform the conversion, and a second mode, where the first control signal is such that said first switch operates in the OFF state, and where the second control signal is generated based on the output voltage in such a way that said converting module performs the conversion and that the output voltage is stabilized at a predetermined target voltage value;

when said power supply apparatus operates in the second mode and a first condition associated with the input voltage is met, said control module generating the first control signal in such a way that said first switch operates in the OFF state, and generating the second control signal in such a way that said converting module performs the conversion and that the output voltage gradually changes toward the input voltage.

2. The power supply apparatus of claim 1, the input voltage being within a range of between a minimum input voltage value and a maximum input voltage value, wherein the conversion performed by said converting module is boost conversion, the target voltage value is greater than the minimum input voltage value, and the first condition is met when the input voltage is greater than a predetermined reference voltage value, which is greater than the minimum input voltage value and less than the maximum input voltage value and the target voltage value.

3. The power supply apparatus of claim 2, wherein the first condition is met when that the input voltage has been greater than the reference voltage value for a predetermined delay time.

4. The power supply apparatus of claim 2, wherein when said power supply apparatus operates in the second mode and the first condition is met, the second control signal is such that the output voltage gradually decreases so as to approach the input voltage.

5. The power supply apparatus of claim 2, wherein said converting module includes an inductor, a diode and a second switch that are coupled to each other in a Y shape among said input and output terminals and a reference node, said inductor being coupled to said input terminal, said diode having a cathode coupled to said output terminal, said second switch being coupled to the reference node and further to said control module, and being operable between an ON state and an OFF state based on the second control signal.

6. The power supply apparatus of claim 1, the input voltage being within a range of between a minimum input voltage value and a maximum input voltage value, wherein the conversion performed by said converting module is buck conversion, the target voltage value is less than the maximum input voltage value, and the first condition is met when the input voltage is less than a predetermined reference voltage value, which is greater than the minimum input voltage value and the target voltage value and less than the maximum input voltage value.

7. The power supply apparatus of claim 6, wherein the first condition is met when the input voltage has been less than the reference voltage value for a predetermined delay time.

8. The power supply apparatus of claim 6, wherein when said power supply apparatus operates in the second mode and the first condition is met, the second control signal is such that the output voltage gradually increases so as to approach the input voltage.

9. The power supply apparatus of claim 6, wherein said converting module includes a second switch, an inductor and a diode that are coupled to each other in a Y shape among said input and output terminals and a reference node, said second switch being coupled to said input terminal and further to said control module, and being operable between an ON state and an OFF state based on the second control signal, said inductor being coupled to said output terminal, said diode having an anode coupled to the reference node.

10. The power supply apparatus of claim 1, wherein when a difference between the input and output voltages decreases to a predetermined gap voltage value, said control module generates the first and second control signals in such a way that said power supply apparatus enters the first mode.

11. The power supply apparatus of claim 10, wherein the gap voltage value is sufficient that the difference between the input and output voltages is zero upon the entrance of said power supply apparatus into the first mode.

12. The power supply apparatus of claim 1, wherein when said power supply apparatus operates in the second mode and the first condition is met, the second control signal is generated based on the output voltage.

13. The power supply apparatus of claim 1, wherein an input current is received at said input terminal, and when said power supply apparatus operates in the second mode and the first condition is met, the second control signal is generated based on the input current.

14. The power supply apparatus of claim 1, wherein:
when said power supply apparatus operates in the first mode and a second condition associated with the input voltage is met, said control module generates the first control signal in such a way that said first switch operates in the OFF state, and generates the second control signal in such a way that said converting module performs the conversion and that the output voltage gradually changes toward the target voltage value; and
when the output voltage reaches the target voltage value, said control module generates the first and second control signals in such a way that said power supply apparatus enters the second mode.

15. The power supply apparatus of claim 14, the input voltage being within a range of between a minimum input voltage value and a maximum input voltage value, wherein the conversion performed by said converting module is boost conversion, the target voltage value is greater than the minimum input voltage value, and the second condition is met when the input voltage is less than a predetermined reference voltage value, which is greater than the minimum input voltage value and less than the maximum input voltage value and the target voltage value.

16. The power supply apparatus of claim 15, wherein when said power supply apparatus operates in the first mode and the second condition is met, the second control signal is generated in such a way that the output voltage gradually increases from a predetermined minimum voltage value, which is greater than or equal to the reference voltage value and less than the target voltage value, so as to approach the target voltage value.

17. The power supply apparatus of claim 14, the input voltage being within a range of between a minimum input voltage value and a maximum input voltage value, wherein the conversion performed by said converting module is buck conversion, the target voltage value is less than the maximum input voltage value, and the second condition is met when the input voltage is greater than a predetermined reference voltage value, which is less than the maximum input voltage value and greater than the minimum input voltage value and the target voltage value.

18. The power supply apparatus of claim 17, wherein when said power supply apparatus operates in the first mode and the second condition is met, the second control signal is generated in such a way that the output voltage gradually decreases from a predetermined maximum voltage value, which is less than or equal to the reference voltage value and greater than the target voltage value, so as to approach the target voltage value.

19. The power supply apparatus of claim 14, wherein when said power supply apparatus operates in the first mode and the second condition is met, the second control signal is generated based on the output voltage.

20. The power supply apparatus of claim 14, wherein an input current is received at said input terminal, and when said power supply apparatus operates in the first mode and the second condition is met, the second control signal is generated based on the input current.

* * * * *